(12) United States Patent
Vickrey et al.

(10) Patent No.: US 11,709,825 B2
(45) Date of Patent: *Jul. 25, 2023

(54) ACCESS CONTROL WITH MULTIPLE SECURITY ECOSYSTEMS

(71) Applicant: Schlage Lock Company LLC, Carmel, IN (US)

(72) Inventors: Michelle Vickrey, Whitestown, IN (US); Devin A. Love, Westfield, IN (US); Raymond F. Rettig, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,937

(22) Filed: Mar. 1, 2022

(65) Prior Publication Data
US 2022/0398242 A1    Dec. 15, 2022

Related U.S. Application Data

(63) Continuation of application No. 16/984,792, filed on Aug. 4, 2020, now Pat. No. 11,263,205, which is a
(Continued)

(51) Int. Cl.
*G06F 16/23* (2019.01)
*H04L 9/40* (2022.01)
*G06F 16/27* (2019.01)

(52) U.S. Cl.
CPC .......... *G06F 16/2379* (2019.01); *G06F 16/27* (2019.01); *H04L 63/102* (2013.01); *H04L 63/20* (2013.01)

(58) Field of Classification Search
CPC ...... G06F 21/30; G06F 16/2379; G06F 16/27; H04L 63/102; H04L 63/20
See application file for complete search history.

(56) References Cited

U.S. PATENT DOCUMENTS 7,454,421 B2 * 11/2008 Imaeda ................. G06F 21/335
707/999.009
7,716,175 B2    5/2010 Hildebrand et al.
(Continued)

FOREIGN PATENT DOCUMENTS

WO    2015145403 A1    10/2015

*Primary Examiner* — Hosuk Song
(74) *Attorney, Agent, or Firm* — Taft Stettinius & Hollister LLP

(57) ABSTRACT

A method according to one embodiment includes monitoring, by an access control device, for changes to a first access control database stored on the access control device, wherein the first access control database is associated with a first security ecosystem having a first set of security protocols; automatically updating a mediation database stored on the access control device to identify a change to the first access control database in response to a determination that the change occurred; and automatically updating a second access control database stored on the access control device based on the change identified in the mediation database and in response to the automatic update of the mediation database, wherein the second access control database is associated with a second security ecosystem different from the first security ecosystem and having a second set of security protocols different from the first set.

20 Claims, 4 Drawing Sheets

Related U.S. Application Data continuation of application No. 15/945,309, filed on Apr. 4, 2018, now Pat. No. 10,733,179.

(56) References Cited

U.S. PATENT DOCUMENTS

| | | | |
|---|---|---|---|
| 8,027,446 B2 * | 9/2011 | Tucker | H04L 67/56 |
| | | | 379/201.12 |
| 8,270,310 B2 | 9/2012 | Raleigh | |
| 8,316,051 B1 | 11/2012 | Burns et al. | |
| 8,516,552 B2 | 8/2013 | Raleigh | |
| 8,522,335 B2 | 8/2013 | Lawrence et al. | |
| 8,613,002 B2 | 12/2013 | Narayanan et al. | |
| 8,832,254 B1 | 9/2014 | Sobel | |
| 10,129,290 B2 | 11/2018 | Thomas et al. | |
| 10,505,972 B2 | 12/2019 | Thomas et al. | |
| 10,616,265 B2 * | 4/2020 | Thomas | H04L 63/1441 |
| 10,733,179 B2 | 8/2020 | Vickrey et al. | |
| 11,196,770 B2 * | 12/2021 | Elias | G06F 21/554 |
| 11,263,205 B2 * | 3/2022 | Vickrey | H04L 63/20 |
| 2006/0047536 A1 | 3/2006 | Ichikawa et al. | |
| 2006/0143189 A1 | 6/2006 | Imaeda et al. | |
| 2017/0202039 A1 | 7/2017 | Logue et al. | |

* cited by examiner

ACCESS CONTROL WITH MULTIPLE SECURITY ECOSYSTEMS

CROSS REFERENCE TO RELATED APPLICATIONS

The present application is a continuation of U.S. patent application Ser. No. 16/984,792 filed Aug. 4, 2020 and issued as U.S. Pat. No. 11,263,205, which is a continuation of U.S. patent application Ser. No. 15/945,309 filed Apr. 4, 2018 and issued as U.S. Pat. No. 10,733,179, the contents of each application hereby incorporated herein by reference in their entirety.

BACKGROUND

Access control systems, building management systems, and smart homes may include various interconnected access control devices and/or other accessory devices. Additionally, in many circumstances, companies may create proprietary or non-proprietary ecosystems (e.g., security ecosystems) that have varying degrees of openness, for example, based on rules associated with the sharing of data. Although a particular accessory device may work well when operating within one ecosystem, there may be circumstances in which the accessory device must be capable of simultaneously supporting multiple ecosystems from a user's perspective. However, simultaneous support of multiple ecosystems may result in a lack of data fluidity and a knowledge imbalance between devices of different ecosystems. For example, a device in a particular ecosystem may change a particular data parameter in that ecosystem (e.g., access permissions for users to an access control device) without the other ecosystem(s) associated with the corresponding device(s) being aware. As such, users of the ecosystem within which the change occurred may be aware of the change, whereas users of the other ecosystem(s) may not be aware of the change.

SUMMARY

According to an embodiment, a method for access control with multiple security ecosystems may include monitoring, by an access control device, for changes to a first access control database stored on the access control device, wherein the first access control database is associated with a first security ecosystem having a first set of security protocols, automatically updating, by the access control device, a mediation database stored on the access control device to identify a change to the first access control database in response to a determination that the change occurred, and automatically updating, by the access control device, a second access control database stored on the access control device based on the change identified in the mediation database and in response to the automatic update of the mediation database, wherein the second access control database is associated with a second security ecosystem different from the first security ecosystem and having a second set of security protocols different from the first set.

In some embodiments, the method may further include monitoring, by the access control device, for changes to the second access control device, automatically updating, by the access control device, the mediation database to identify a second change to the second access control database in response to a determination that the second change occurred, and automatically updating, by the access control device, the first access control database based on the second change identified in the mediation database and in response to the automatic update of the mediation database to identifying the second change.

In some embodiments, the first access control database may include a user database that identifies access permissions of a plurality of users of the access control device.

In some embodiments, the first access control database may include an event database that identifies occurrences of one or more events that have occurred at the access control device and associated with the first security ecosystem.

In some embodiments, monitoring for changes to the first access control database may include monitoring for changes to the first access control database based on mediation security rules, wherein the mediation security rules identify particular data fields to be automatically stored to the mediation database.

In some embodiments, the first access control database may include a first set of accessible data fields and a second set of secure, inaccessible data fields.

In some embodiments, monitoring for changes to the first access control database may exclude the secure, inaccessible data fields based on the mediation security rules.

In some embodiments, the method may further include transmitting, by the access control device, a notification of the update to the second access control database to a device associated with the second security ecosystem.

In some embodiments, the method may further include detecting, by the access control device, an occurrence of an event at the access control device, automatically updating, by the access control device, the first access control database based on and in response to the occurrence of the event, and automatically updating, by the access control device, the second access control database based on and in response to the occurrence of the event.

In some embodiments, the method may further include prompting a user of a device associated with the second security ecosystem to provide a label for modified data associated with the update of the second access control database.

According to another embodiment, an access control device associated with multiple security ecosystems may include at least one processor and at least one memory comprising a first access control database, a second access control database, a mediation database, and a plurality of instructions stored thereon that, in response to execution by the at least one processor, causes the access control device to monitor for changes to the first access control database, automatically update the mediation database to identify a change to the first access control database in response to a determination that the change occurred, and automatically update the second access control database based on the change identified in the mediation database and in response to the automatic update of the mediation database, wherein the first access control database is associated with a first security ecosystem having a first set of security protocols, and wherein the second access control database is associated with a second security ecosystem different from the first security ecosystem and having a second set of security protocols different from the first set.

In some embodiments, the first access control database may include a user database that identifies access permissions of a plurality of users of the access control device.

In some embodiments, the first access control database may include an event database that identifies occurrences of one or more events that have occurred at the access control device and associated with the first security ecosystem.

In some embodiments, to monitor for changes to the first access control database may include to monitor for changes to the first access control database based on mediation security rules that identify particular data fields to be automatically stored to the mediation database.

In some embodiments, the plurality of instructions may further cause the access control device to detect an occurrence of an event at the access control device, automatically update the first access control database based on and in response to the occurrence of the event, and automatically update the second access control database based on and in response to the occurrence of the event.

According to yet another embodiment, a associated with multiple ecosystems may include a first ecosystem device associated with a first security ecosystem having a first set of security protocols, a second ecosystem device associated with a second security ecosystem different from the first security ecosystem and having a second set of security protocols different from the first set, and an accessory device associated with the first security ecosystem and the second security ecosystem. The accessory device may include a processor and a memory comprising a first ecosystem database, a second ecosystem database, a mediation database, and a plurality of instructions stored thereon that, in response to execution by the processor, causes the accessory device to monitor for changes to the first ecosystem database, automatically update the mediation database to identify a change to the first ecosystem database in response to a determination that the change occurred, and automatically update the second ecosystem database based on the change identified in the mediation database and in response to the automatic update of the mediation database.

In some embodiments, the first ecosystem device may be a first mobile device, and the second ecosystem device may be a second mobile device.

In some embodiments, the accessory device may include an access control device, the first ecosystem database may include a first access control database, and the second ecosystem database may include a second access control database.

In some embodiments, the first access control database may include a user database that identifies access permissions of a plurality of users of the access control device.

In some embodiments, the first access control database may include an event database that identifies occurrences of one or more events that have occurred at the access control device and associated with the first security ecosystem.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
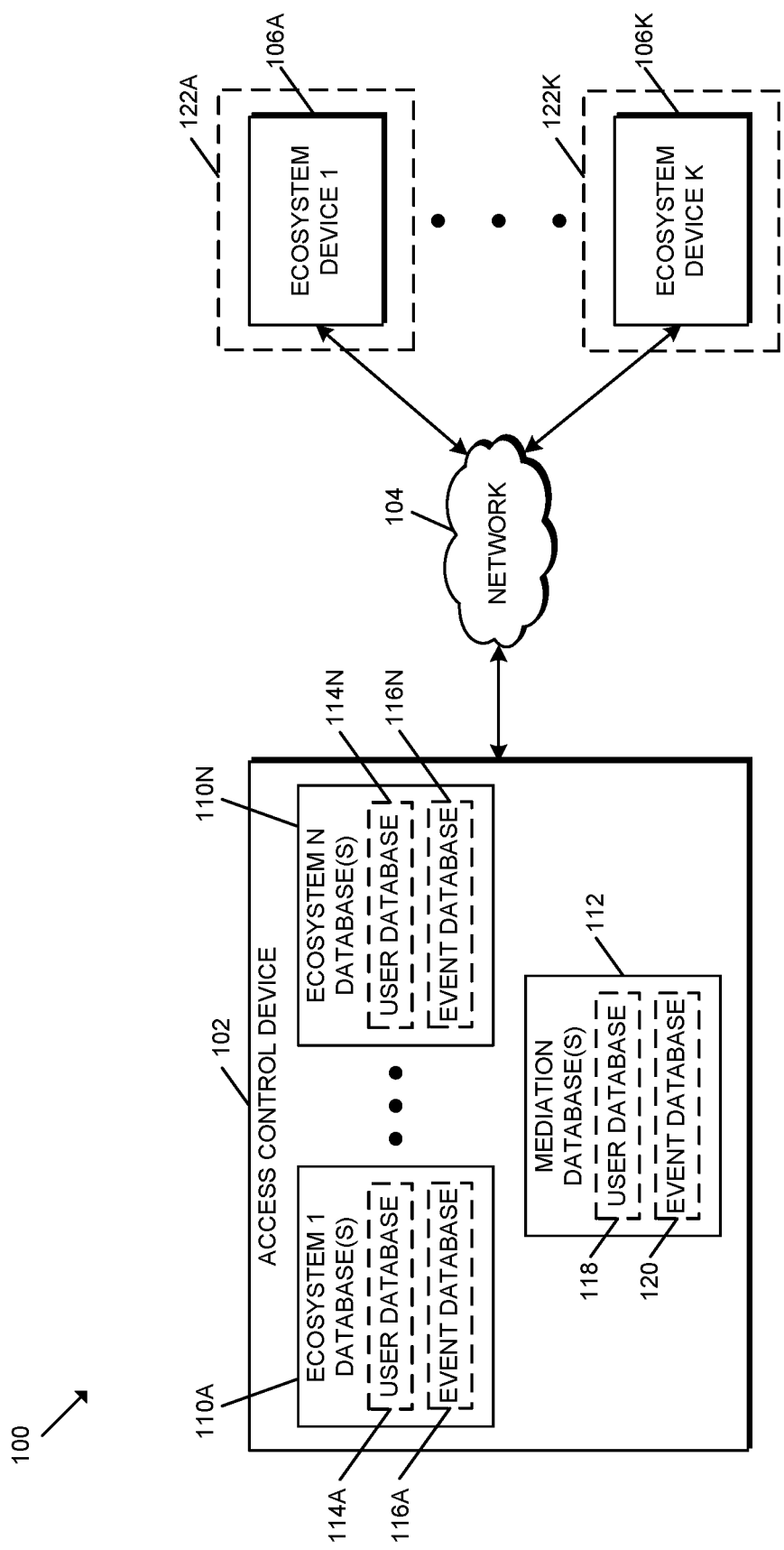
FIG. 1 is a simplified block diagram of at least one embodiment of an access control system with multiple security ecosystems.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 with multiple security ecosystems includes an access control device 102, a network 104, and a plurality of ecosystem devices 106.

As described in detail below, the illustrative system 100 allows for a single access control device 102 (or other accessory device) supporting a plurality of ecosystems to maintain certain information regarding the usage of the ecosystems and report information changes in one ecosystem to users/devices of one or more of the other supported ecosystems. In other words, the access control device 102 may act as a bridge between the ecosystems to facilitate the distribution of information between ecosystems without requiring the ecosystems to directly communicate with one another. In some embodiments, a particular ecosystem may have no, or limited, knowledge of the other ecosystem(s). As described herein, the access control device 102 may maintain one or more ecosystem databases 114 for each of the supported ecosystems to store data and otherwise satisfy the requirements associated with the corresponding ecosystem. Additionally, the access control device 102 may include a mediation database 112 that stores data related to various activities that occur within any of the ecosystems supported by the access control device 102. For example, a user on one ecosystem may perform an action involving the access control device 102, and another user of a different ecosystem may be subsequently notified of the action.

By way of example, a lock on a door may support a home management system of a first company (i.e., a first ecosystem) and also support another home management system of a second company (i.e., a second ecosystem). It should be appreciated that each of the ecosystems has its own set of protocols, security standards, and/or other rules. However, different ecosystems may include overlapping data fields including, for example, user access permissions to the lock, a log of events that have occurred at the lock, settings related to the lock's performance, and/or other common data/fields. The overlapping or common data may be stored in the mediation database 112. In such an example involving two ecosystems, one user may be using a device that is associated with the lock and belongs to the first ecosystem, whereas another user may be using a device that is associated with the lock and belongs to the second ecosystem. Because many devices/systems only show changes that occurred within the same ecosystem (e.g., by virtue of no or limited access to the other ecosystem(s)), it is common for a knowledge imbalance to arise between the ecosystems. For example, the user device belonging to the first ecosystem may add another user to the lock, which is typically updated within the first ecosystem but not the second ecosystem. As such, users of the second ecosystem are generally unaware of the addition of that user. However, in the illustrative embodiment, the techniques described herein allow for the second ecosystem to be efficiently informed of the addition of the user to resolve the knowledge imbalance (e.g., by leveraging the mediation database 112). Further, the system 100 may do so without updating an application programming interface (API) of any of the ecosystems.

In the illustrative embodiment, while changes at the ecosystem level essentially "fall through" the mediation database 112 to the other ecosystems, changes and/or event occurrences at the lock may be funneled from the lock to each of the ecosystems (e.g., directly and/or via the mediation database 112). For example, if the access control device 102 detects the occurrence of an event, one or more (e.g., all) of the ecosystem databases 110 stored on the access control device 102 may be updated accordingly (e.g., directly or via the mediation database 112).

It should be appreciated that the access control device 102 and/or the ecosystem devices 106 may be embodied as any type of device or collection of devices capable of performing the functions described herein. More specifically, in the illustrative embodiment, the access control device 102 may be embodied as any type of device capable of controlling access through a passageway. For example, in various embodiments, the access control device 102 may be embodied as an electronic lock having a physical lock mechanism (e.g., a mortise lock, a cylindrical lock, or a tubular lock). In some embodiments, the access control device 102 may include a credential reader or be electrically/communicatively coupled to a credential reader configured to read credentials.

As shown in FIG. 1 and described in further detail below, the access control device 102 includes ecosystem databases 114 and one or more mediation databases 112. In particular, in some embodiments, the access control device 102 may include a separate ecosystem database 110 (e.g., access control database) for each ecosystem associated with the access control device 102 (e.g., for each ecosystem in which the access control device 102 is a part). The separate ecosystem databases 110 are denoted as ecosystem databases 110A-N, where N is an integer corresponding with the number of ecosystems associated with (or, alternatively, the number of ecosystems capable of being associated with) the access control device 102. In the illustrative embodiment, each ecosystem database 110 includes, or is composed of, a user database 114 and an event database 116. The separate user databases 114 are denoted as user databases 114A-N, where N is an integer corresponding with the number of ecosystems associated with (or, alternatively, the number of ecosystems capable of being associated with) the access control device 102, and the separate event databases 116 are denoted as event databases 116A-N, where N is an integer corresponding with the number of ecosystems associated with (or, alternatively, the number of ecosystems capable of being associated with) the access control device 102. Although the databases 114, 116 are described herein as separate databases, it should be appreciated that the associated content of those databases may form portions of the same database (e.g., the corresponding ecosystem database 110) in other embodiments. Similarly, in some embodiments, the separate ecosystem databases 116A-N may form portions of the same database. As shown, the illustrative mediation database 112 includes a user database 118 and an event database 120, which in some embodiments may form portions of the same database. It should be further appreciated that each of the databases 110, 112, 114, 116, 118, 120, or the singular database as the case may be, may be embodied as any type of data structure(s) consistent with the functions described herein.

In the illustrative embodiment, each user database 114 is configured to store data associated with the users of the corresponding ecosystem. For example, the user database 114 may store data associated with user access permissions, user credentials, time-limited access schedules, whitelists, blacklists, and/or other suitable data associated with the users of the ecosystem. Additionally, each event database 116 is configured to store data associated with events that have occurred in relation to the access control device 102. For example, the event database 116 may store data associated with attempts to access the access control device 102 including, for example, whether such an attempt was successful or unsuccessful, the user and/or credential associated with the access attempt, the time/date at which the access attempt occurred, and/or other data associated with access attempts. Further, the event database 116 may store data associated with the occurrence of other events at the access control device 102 including, for example, a tamper event, a door prop event, a locking/latching of a lock mechanism, an unlocking/unlatching of a lock mechanism, an update of the access control device 102 (e.g., a credential update), and/or other relevant event data. Of course, the event database 116 may also store time, date, and/or other contextual data (e.g., environmental factors) associated with the occurrence of the identified event. One or more of the ecosystem database(s) 110 may also store data associated with the current settings of the access control device 102, diagnostics information, and/or other relevant data. Because each ecosystem may have its own set of protocols, security standards, and/or other rules, it should be appreciated that the particular data stored in the corresponding ecosystem database(s) 110, user database 114, and/or event database 116 may vary among ecosystems. To simplify the description, it should be appreciated that the user database 114 and event database 116 may be described herein as being portions of the same ecosystem database 110.

As described herein, in the illustrative embodiment, the one or more mediation database(s) 112 are configured to store data received/retrieved from the ecosystem databases 110A-N of the various ecosystems. For example, in some embodiments, the data from the user databases 114A-N may be stored to the user database 118 of the mediation database(s) 112 and the data from the event databases 116A-N may be stored to the event database 120 of the mediation database(s) 112. To simplify the description, it should be appreciated that the user database 118 and the event database 120 may be described herein as being portions of the same mediation database 112.

In the illustrative embodiment, the particular data received/retrieved from the ecosystem databases 110A-N and stored to the mediation database 112 depends on the particular mediation security rules established by/for the access control device 102. In some embodiments, the mediation security rules may identify specific data fields to be received/retrieved from the ecosystem databases 110A-N. For example, in some embodiments, the mediation security rules may identify specific data fields that are known and/or anticipated to be common across multiple ecosystem databases 110A-N for storage to the mediation database 112. As described above, each of the ecosystems may have its own set of protocols, security standards, and/or other rules. For example, a particular ecosystem (e.g., an Apple security ecosystem) may identify specific data or data fields as being secure, inaccessible data or data fields. In such embodiments, the secure, inaccessible data may or may not even be "visible" to the access control device 102 and therefore the mediation database 112. In some embodiments, the mediation security rules may be modifiable, at least in part, by an administrator or a user (e.g., depending on the user's access permissions) of the access control system 100. For example, a particular administrator may limit the mediation database 112 to storing data associated with changes to user access permissions. In other embodiments, the mediation security rules may be defined, for example, by a manufacturer of the access control device 102 (or other accessory device).

As described below, in some embodiments, the access control device 102 may monitor the ecosystem databases 110A-N for changes and automatically store those changes to the mediation database 112. Additionally, in some embodiments, the format of common data fields may vary among the ecosystems; as such, the access control device 102 may be configured to convert or translate the data received/retrieved from the various ecosystem databases 110A-N into a common format for storage to the mediation database 112. Likewise, when data is stored from the mediation database 112 to one or more of the ecosystem databases 110A-N, the data may be converted or translated into the appropriate format of the corresponding ecosystem databases 110A-N.

In the illustrative embodiment, the access control device 102 may communicate with one or more ecosystem devices 106 over any suitable network 104. The network 104 may be embodied as any type of communication network or connection(s) capable of facilitating communication between the access control device 102 and remote devices (e.g., the ecosystem devices 106). As such, the network 104 may include one or more networks, routers, switches, computers, and/or other intervening devices. For example, the network 104 may be embodied as or otherwise include one or more cellular networks, telecommunication networks, local or wide area networks, publicly available global networks (e.g., the Internet), ad hoc networks, short-range communication links, and/or a combination thereof.

As shown, each of the ecosystem devices 106 belongs to and/or is associated with a particular ecosystem 122. The separate ecosystem devices 106 are denoted as ecosystem devices 106A-K, where K is an integer corresponding with the number of ecosystem devices 106 configured to communicate with (or, alternatively, the number of ecosystem device 106 likely to be, or capable of being, in communication with) the access control device 102, and the corresponding ecosystems 122 of those ecosystem devices 106A-K are denoted as ecosystems 122A-K. Although the ecosystem devices 106A-K are shown as belonging to different ecosystems 122A-K, it should be appreciated that multiple ecosystem devices 106A-K can belong to or otherwise be associated with the same ecosystem 122 in some embodiments. For example, two ecosystem devices 106 can belong to the same ecosystem 122A. Further, in some embodiments, a single ecosystem device 106 can belong to or otherwise be associated with multiple ecosystems 122. For example, a particular ecosystem device 106A can belong to the ecosystems 122A, 122B, 122C. In some embodiments, a particular ecosystem device 106 may be considered to belong to or be associated with a particular ecosystem 122 based on the hardware, firmware, and/or software environment(s) of the ecosystem device 106 (e.g., based on a particular application executed on the device 106). For example, in some embodiments, Apple smart devices may be associated with the same Apple ecosystem 122. It should be further appreciated that the level of granularity associated with defining the distinct ecosystems 122 may vary depending on the particular embodiment.

It should be appreciated that each of the access control devices 102 and/or the ecosystem devices 106 may be embodied as one or more computing devices similar to the computing device 200 described below in reference to FIG. 2. For example, in the illustrative embodiment, each of the access control devices 102 and the ecosystem devices 106 includes a processing device 202 and a memory 206 having stored thereon operating logic 208 for execution by the processing device 202 for operation of the corresponding device.

Although only one access control device 102 is shown in the illustrative embodiment of FIG. 1, the system 100 may include multiple access control devices 102 in other embodiments. For example, a particular ecosystem device 106 may be configured to communicate with multiple access control devices 102 in some embodiments. Further, although the device 102 is described herein as an access control device, it should be appreciated that the device 102 may be embodied as another type of accessory device in other embodiments. Similarly, although the system 100 is described herein as an access control system, it should be appreciated that the system 100 may be embodied as another type of system that includes an accessory device associated with at least two different ecosystems (e.g., two different security ecosystems).

Figure 2:
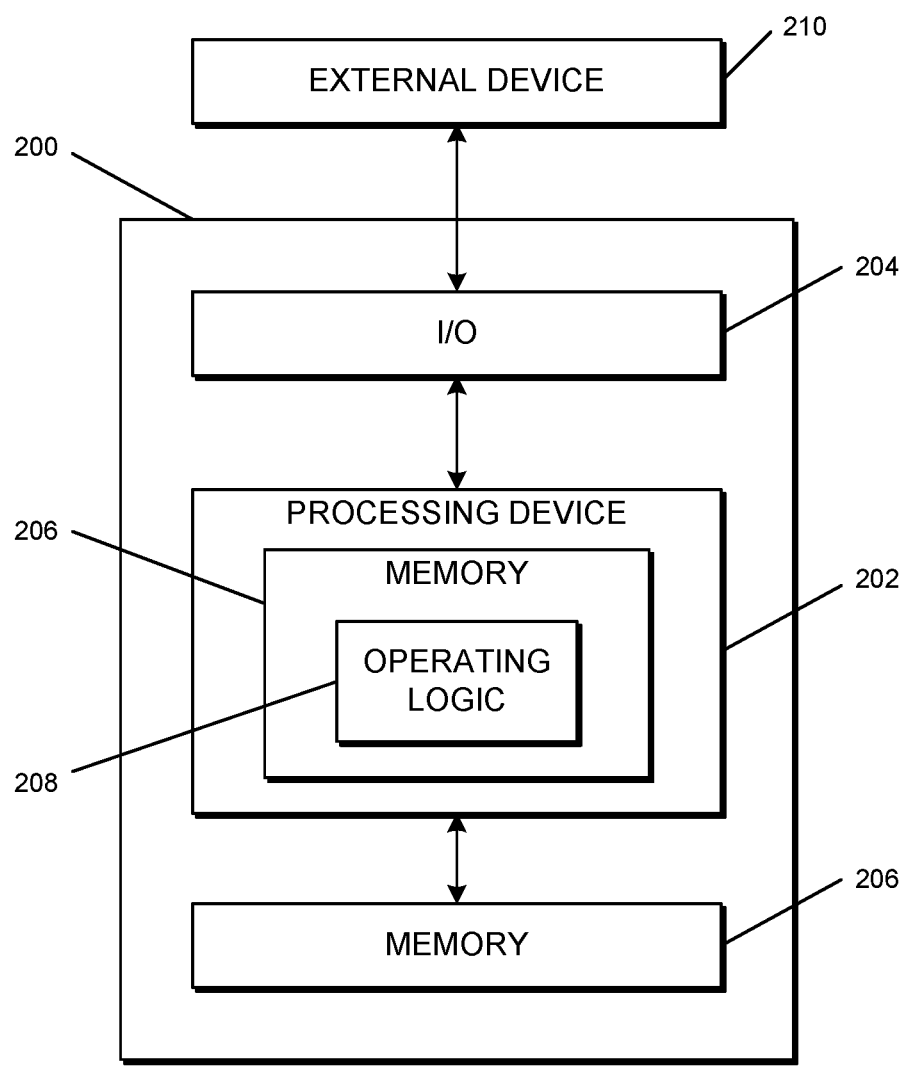
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device 102 and/or ecosystem device 106 illustrated in FIG. 1. Depending on the particular embodiment, computing device 200 may be embodied as an access control device, reader device, mobile computing device, cellular phone, smartphone, wearable computing device, personal digital assistant, Internet of Things (IoT) device, server, desktop computer, laptop computer, tablet computer, notebook, netbook, Ultrabook™, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102 and/or the ecosystem devices 106. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
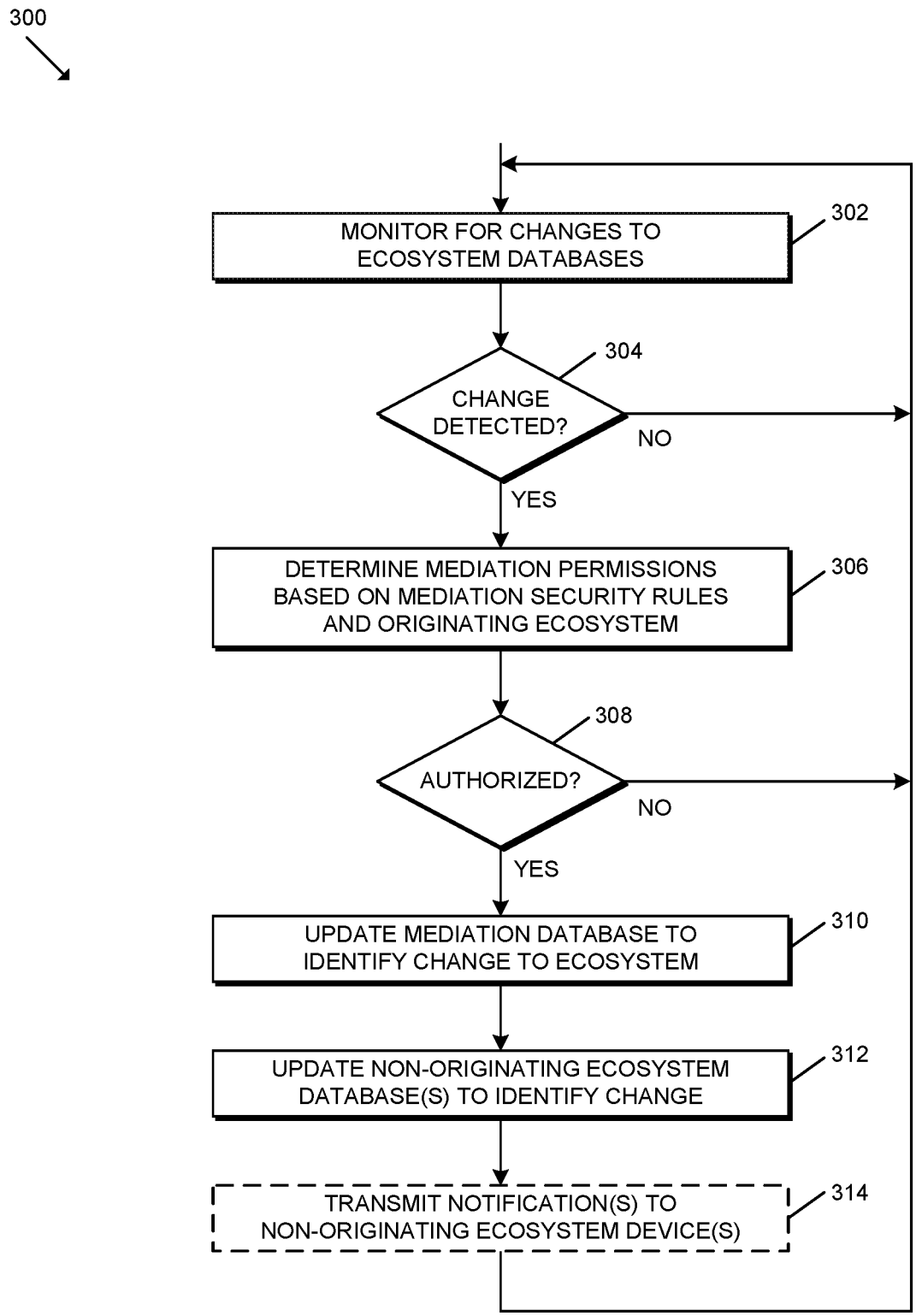
FIG. 3 is a simplified flow diagram of at least one embodiment of a method for access control with multiple security ecosystems.

Referring now to FIG. 3, in use, the system 100 or, more specifically, the access control device 102 may execute a method 300 for access control with multiple security ecosystems. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the access control device 102 monitors the ecosystem database(s) 110 for changes to one or more of the databases 110. It should be appreciated that the access control device 102 may monitor for changes continuously, periodically, or in response to the occurrence of one or more conditions depending on the particular embodiment. Further, as indicated above, in some embodiments, the access control device 102 may monitor for any changes to any data of the ecosystem database(s) 110, whereas in other embodiments, the access control device 102 may only monitor for changes to particular data and/or data fields stored within the ecosystem database(s) 110. For example, in some embodiments, some data of one or more ecosystem databases 110 may be secure and inaccessible to the access control device 102 and/or may not even be "visible" to the access control device 102 (e.g., at least for the purpose of storing the data to the mediation database 112).

If the access control device 102 has not detected a change in block 304, the method 300 returns to block 302 in which the access control device 102 continues to monitor for changes to the ecosystem database(s) 110. However, if the access control device 102 determines in block 304 that a change to one or more of the ecosystem databases 110 has occurred, the method 300 advances to block 306 in which the access control device 102 determines the mediation permissions of the access control device 102 based on the mediation security rules and the ecosystem that originated/caused the change (e.g., based on the particular ecosystem database 110 that was modified). As described above, the mediation security rules may identify the particular data fields to be automatically stored to the mediation database 112 from an ecosystem database 110 based on a change to the ecosystem database 110. Further, as described above, the ecosystem that originated the change may prevent certain data (e.g., secure data) from being accessible to the mediation database 112 and/or require that the access control device 102 not store the data to the mediation database 112.

If the access control device 102 determines in block 308 that the storage of the changed data to the mediation database 112 is not authorized, the method 300 returns to block 302 in which the access control device 102 continues to monitor for changes to the ecosystem database(s) 110. However, if the access control device 102 determines in block 308 that the storage of the changed data to the mediation database 112 is authorized, the method 300 advances to block 310 in which the access control device 102 updates the mediation database 112 to identify the change to the relevant ecosystem database 110 and, therefore, to the originating ecosystem. In some embodiments, the access control device 102 may copy the changed data from the ecosystem database 110 to the mediation database 112. In other embodiments, the access control device 102 may convert and/or translate the changed data into a different format (e.g., a common format) for storage to the mediation database 112. Further, in other embodiments, the access control device 102 may otherwise update the mediation database 112 to identify the change. It should be appreciated that, in some embodiments, the blocks 306-310 may be omitted and/or performed implicitly. For example, in some embodiments, the originating ecosystem may prevent access to certain data such that the mediation database 112 may monitor for changes to and store data associated with changes to the remaining accessible data.

In block 312, the access control device 102 updates one or more (e.g., all) of the non-originating ecosystem databases 110 to identify the change to the mediation database 112. Depending on the particular embodiment, the non-originating ecosystem databases 110 may be updated immediately, periodically, or in response to the occurrence of one or more conditions (e.g., in response to an access attempt by a device 106 associated with that ecosystem). As described above, the access control device 102 may update the non-originating ecosystem databases 110 by copying the changed data from the mediation database 112 to the non-originating ecosystem databases 110, by converting and/or translating the changed data into a different format (e.g., from a common format to a format associated with the particular ecosystem) and storing the converted data to the non-originating ecosystem databases 110, and/or by otherwise updating the non-originating ecosystem databases 110. It should be appreciated that the non-originating ecosystem databases 110 may be updated differently depending on the particular embodiment (e.g., depending on the particular ecosystems involved). In some embodiments, in block 314, the access control device 102 may transmit a notification of the update to the non-originating ecosystem database(s) 110 to one or more devices (e.g., ecosystem devices 106) associated with the corresponding non-originating ecosystem(s). Further, in some embodiments, it should be appreciated that the user of the non-originating ecosystem device(s) 106 may be prompted (e.g., via the notification message) to provide additional data associated with the change. For example, in some embodiments, the non-originating ecosystem device(s) 106 may be prompted to provide a label for the modified data associated with the update (e.g., a "friendly" name for a newly added user).

The method 300 returns to block 302 to continue monitoring for changes to the ecosystem databases 110. Although the blocks 302-314 are described in a relatively serial manner, it should be appreciated that various blocks of the method 300 may be performed in parallel in some embodiments.

Figure 4:
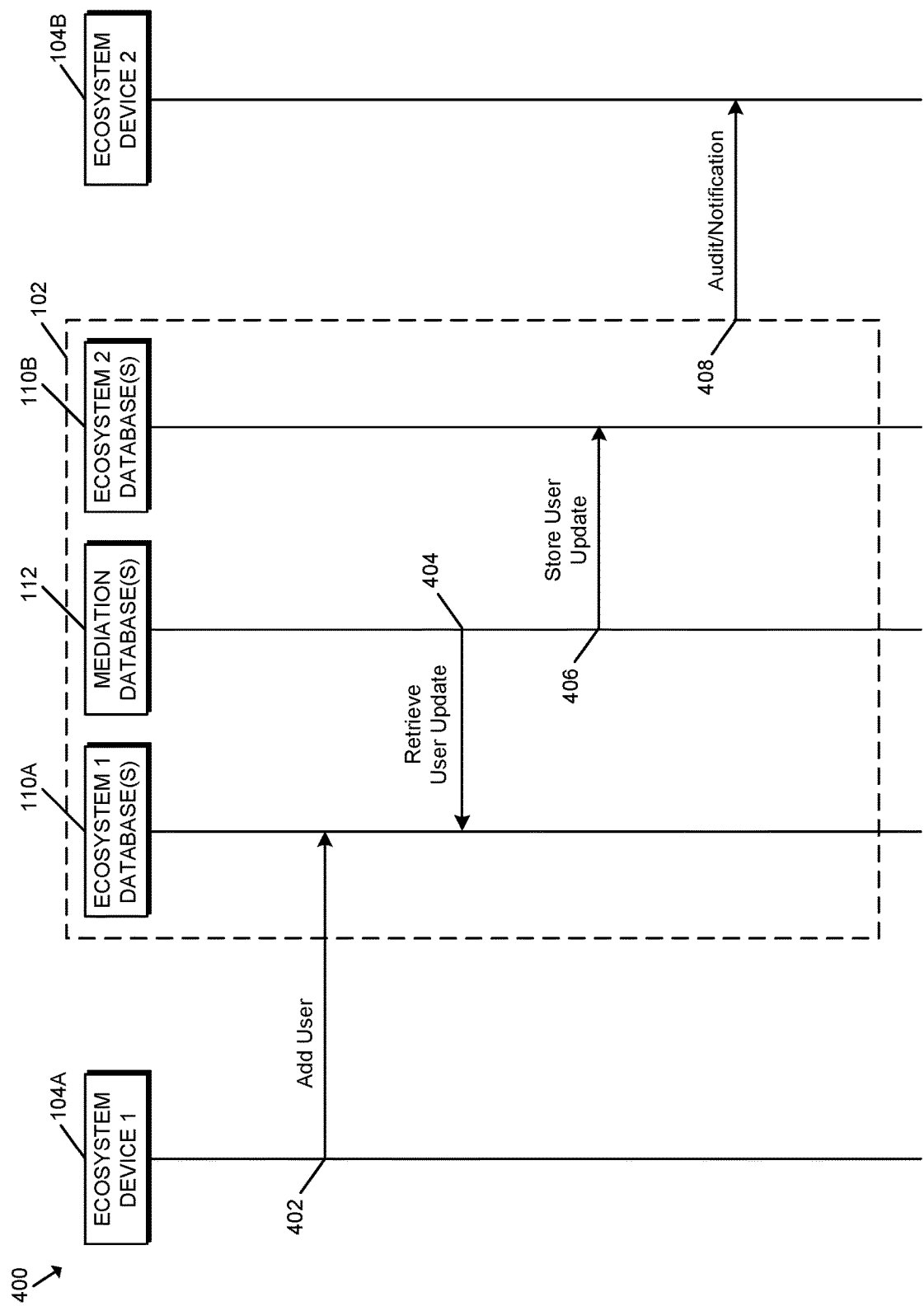
FIG. 4 is a simplified flow diagram illustrating various data flows associated with a user update to the access control system of FIG. 1.

Referring now to FIG. 4, in use, the access control system 100 may execute a method 400, which depicts various data flows associated with a user update to the access control system 100. In particular, FIG. 4 depicts data flows associated with a user being added to a first ecosystem (and therefore a first ecosystem database 110A) and the subsequent updating of a second ecosystem (and therefore a second ecosystem database 110B) by virtue of the mediation database 112. It should be appreciated that the particular data flows of the method 400 may omit one or more features in order to emphasize various aspects of the data flows of the access control system 100 in this particular embodiment. As such, it should be appreciated that the particular data flows of the method 400 are illustrated by way of example, and such data flows may be combined or divided, added or removed, and/or reordered in whole or in part depending on the particular embodiment, unless stated to the contrary.

The illustrative method 400 begins with data flow 402 in which a user is added to (e.g., granted access permissions to) the access control device 102 via an ecosystem device 104A (e.g., a mobile device) operating within and/or belonging to a first ecosystem. As such, the access control device 102 stores the data identifying the user addition to the first ecosystem database 110A associated with the first ecosystem. In data flow 404, the access control device 102, for example, while monitoring for changes to the ecosystem database 110A, detects the change to the ecosystem database 110A, retrieves/receives the data identifying the user addition (e.g., automatically), and stores data identifying the user update/addition to the mediation database 112. As described above, depending on the particular embodiment, the data stored to the mediation database 112 may be the same or different from the data stored to the ecosystem database 110A. In data flow 406, the access control device 102 stores the user update/addition (e.g., automatically) from the mediation database 112 to the ecosystem database 110B. Similarly, depending on the particular embodiment, the data stored to the ecosystem database 110B may be the same or different from the data stored to the ecosystem database 110A and/or the mediation database 112. In data flow 408, the access control device 102 may transmit an audit/notification message to an ecosystem device 104B of the second ecosystem notifying the device 104B that the change has occurred.

What is claimed is:

1. A method for access control with multiple security ecosystems, comprising:
monitoring, by an access control system, one or more data fields of a first access control database stored on the access control system based on one or more mediation security rules, wherein the first access control database is associated with a first security ecosystem;
automatically updating, by the access control system, a mediation database stored on the access control system to identify a change to the one or more data fields of the first access control database in response to a determination that the change to the one or more data fields of the first access control database occurred; and
automatically updating, by the access control system, a second access control database stored on the access control system based on the change to the one or more data fields of the first access control database identified in the mediation database and in response to the automatically updating of the mediation database, wherein the second access control database is associated with a second security ecosystem different from the first security ecosystem.

2. The method of claim 1, wherein the one or more data fields of the first access control database include a field associated with user access permissions to an access control device of the access control system.

3. The method of claim 1, wherein the one or more data fields of the first access control database include a field associated with a log of events.

4. The method of claim 1, wherein the one or more data fields of the first access control database include a field associated with settings related to performance of the access control system.

5. The method of claim 1, wherein the first security ecosystem defines a first set of protocols, security standards, and rules; and
wherein the second security ecosystem defines a second set of protocols, security standards, and rules.

6. The method of claim 1, further comprising automatically updating, by the access control system, a third access control database stored on the access control system based on the change to the one or more data fields of the first access control database identified in the mediation database and in response to the automatically updating of the mediation database, wherein the third access control database is associated with a third security ecosystem different from the first security ecosystem and the second security ecosystem.

7. The method of claim 6, wherein the automatically updating of the second access control database comprises translating data identifying the change to the one or more data fields of the first access control database into a data format associated with the second security ecosystem; and
wherein the automatically updating of the third access control database comprises translating the data identifying the change to the one or more data fields of the first access control database into a data format associated with the third security ecosystem.

8. The method of claim 7, wherein the data format associated with the second security ecosystem is different from the data format associated with the third security ecosystem.

9. The method of claim 1, wherein only the one or more data fields of the first access control database include data accessible for storage to the mediation database.

10. An access control system associated with multiple security ecosystems, the access control system comprising:
a first access control database associated with a first security ecosystem;
a second access control database associated with a second security ecosystem different from the first security ecosystem;
a mediation database;
at least one processor; and
at least one memory comprising a plurality of instructions stored thereon that, in response to execution by the at least one processor, causes the access control system to:
monitor one or more data fields of the first access control database based on one or more mediation security rules;
automatically update the mediation database to identify a change to the one or more data fields of the first access control database in response to a determination that the change to the one or more data fields of the first access control database occurred; and
automatically update the second access control database based on the change to the one or more data fields of the first access control database identified in the mediation database and in response to the automatic update of the mediation database.

11. The access control system of claim 10, wherein the one or more data fields include a field associated with (i)

user access permissions to an access control device of the access control system, (ii) a log of events, or (iii) settings related to performance of the access control system.

12. The access control system of claim 10, wherein the first security ecosystem defines a first set of protocols, security standards, and rules; and
wherein the second security ecosystem defines a second set of protocols, security standards, and rules.

13. The access control system of claim 10, further comprising a third access control database associated with a third security ecosystem different from the first security ecosystem and the second security ecosystem; and
wherein the plurality of instructions further causes the access control system to automatically update the third access control database based on the change to the one or more data fields of the first access control database identified in the mediation database and in response to the automatic update of the mediation database.

14. The access control system of claim 13, wherein to automatically update the second access control database comprises to translate data identifying the change to the one or more data fields of the first access control database into a data format associated with the second security ecosystem; and
wherein to automatically update the third access control database comprises to translate the data identifying the change to the one or more data fields of the first access control database into a data format associated with the third security ecosystem.

15. The access control system of claim 10, wherein only the one or more data fields of the first access control database include data accessible for storage to the mediation database.

16. The access control system of claim 10, wherein the first access control database, the second access control database, and the mediation database form portions of a single database.

17. An electronic lock device, comprising:
a first access control database associated with a first security ecosystem;
a second access control database associated with a second security ecosystem different from the first security ecosystem;
a mediation database;
a processor; and
a memory comprising a plurality of instructions stored thereon that, in response to execution by the processor, causes the electronic lock device to:
monitor one or more data fields of the first access control database based on one or more mediation security rules;
automatically update the mediation database to identify a change to the one or more data fields of the first access control database in response to a determination that the change to the one or more data fields of the first access control database occurred; and
automatically update the second access control database based on the change to the one or more data fields of the first access control database identified in the mediation database and in response to the automatic update of the mediation database.

18. The electronic lock device of claim 17, wherein the one or more data fields include a field associated with (i) user access permissions to the electronic lock device, (ii) a log of events, or (iii) settings related to performance of the electronic lock device.

19. The electronic lock device of claim 17, wherein only the one or more data fields of the first access control database include data accessible for storage to the mediation database.

20. The electronic lock device of claim 17, wherein the first access control database, the second access control database, and the mediation database form portions of a single database.

* * * * *